United States Patent [19]

Barhydt

[11] 3,708,666
[45] Jan. 2, 1973

[54] MULTIPLE DETECTOR SCANNER WITH DETECTORS SPACED ACROSS SCAN DIRECTION

[75] Inventor: Hamilton Barhydt, Playa Del Rey, Calif.

[73] Assignee: Hughes Aircraft Company, Culver City, Calif.

[22] Filed: April 30, 1970

[21] Appl. No.: 33,415

Related U.S. Application Data

[63] Continuation-in-part of Ser. No. 746,555, July 22, 1968.

[52] U.S. Cl.................250/83.3 H, 178/6, 178/7.6, 250/220 R, 250/236
[51] Int. Cl...........G01t 1/16, H04n 3/00, H04n 7/00
[58] Field of Search .178/6, 7.6; 250/220, 209, 219 I, 250/236, 83.3 IR, 220 M

[56] References Cited

UNITED STATES PATENTS

| | | | |
|---|---|---|---|
| 3,243,507 | 3/1966 | Macovski | 178/6 |
| 3,069,493 | 12/1962 | Martel | 178/6 |
| 3,609,226 | 9/1971 | Thompson | 178/6 |

Primary Examiner—Archie R. Borchelt
Assistant Examiner—T. N. Grigsby
Attorney—James K. Haskell and Allen A. Dicke, Jr.

[57] ABSTRACT

The multiple element detector array scanner achieves improved angular resolution in a direction at right angles to the scan direction, by spacing the detectors by substantially one-half detector width in the direction at right angles to the scan direction, rather than reducing the size of the detector. This array arrangement is particularly useful with infrared detector elements.

19 Claims, 11 Drawing Figures

PATENTED JAN 2 1973
3,708,666
SHEET 1 OF 3
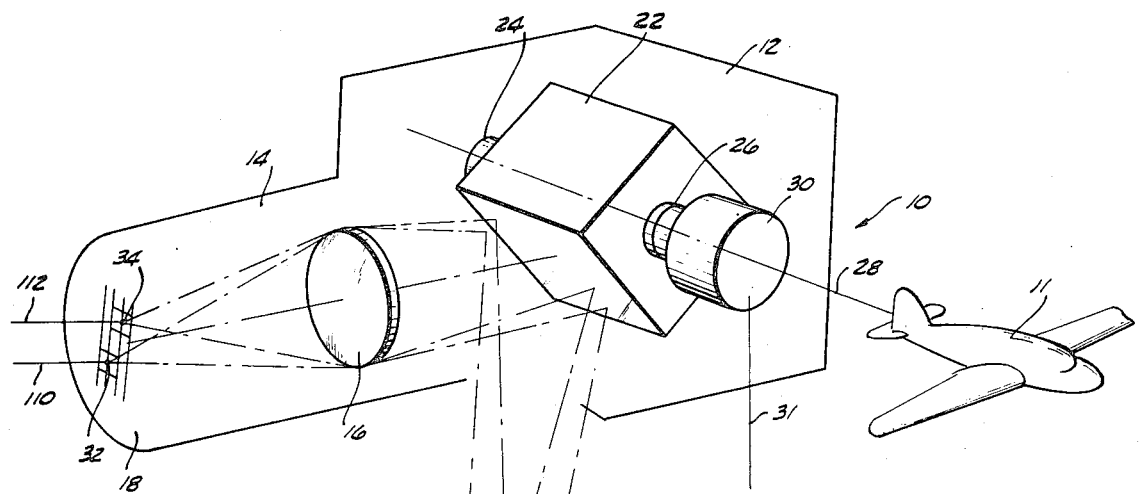
FIG. 1.
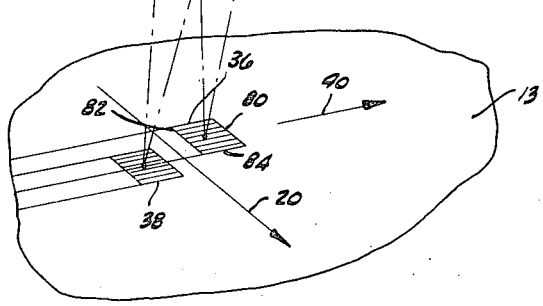
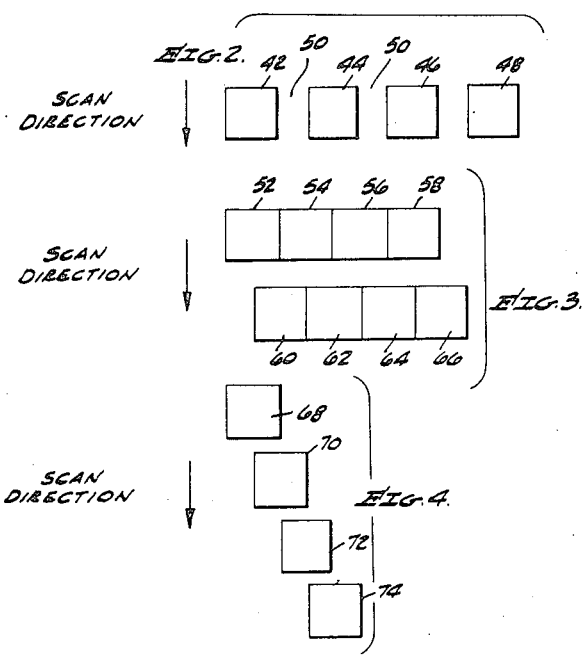
FIG. 2.
FIG. 3.
FIG. 4.
FIG. 5.
INVENTOR.
HAMILTON BARHYDT,
BY
Allen A. Dicke, Jr.
AGENT.

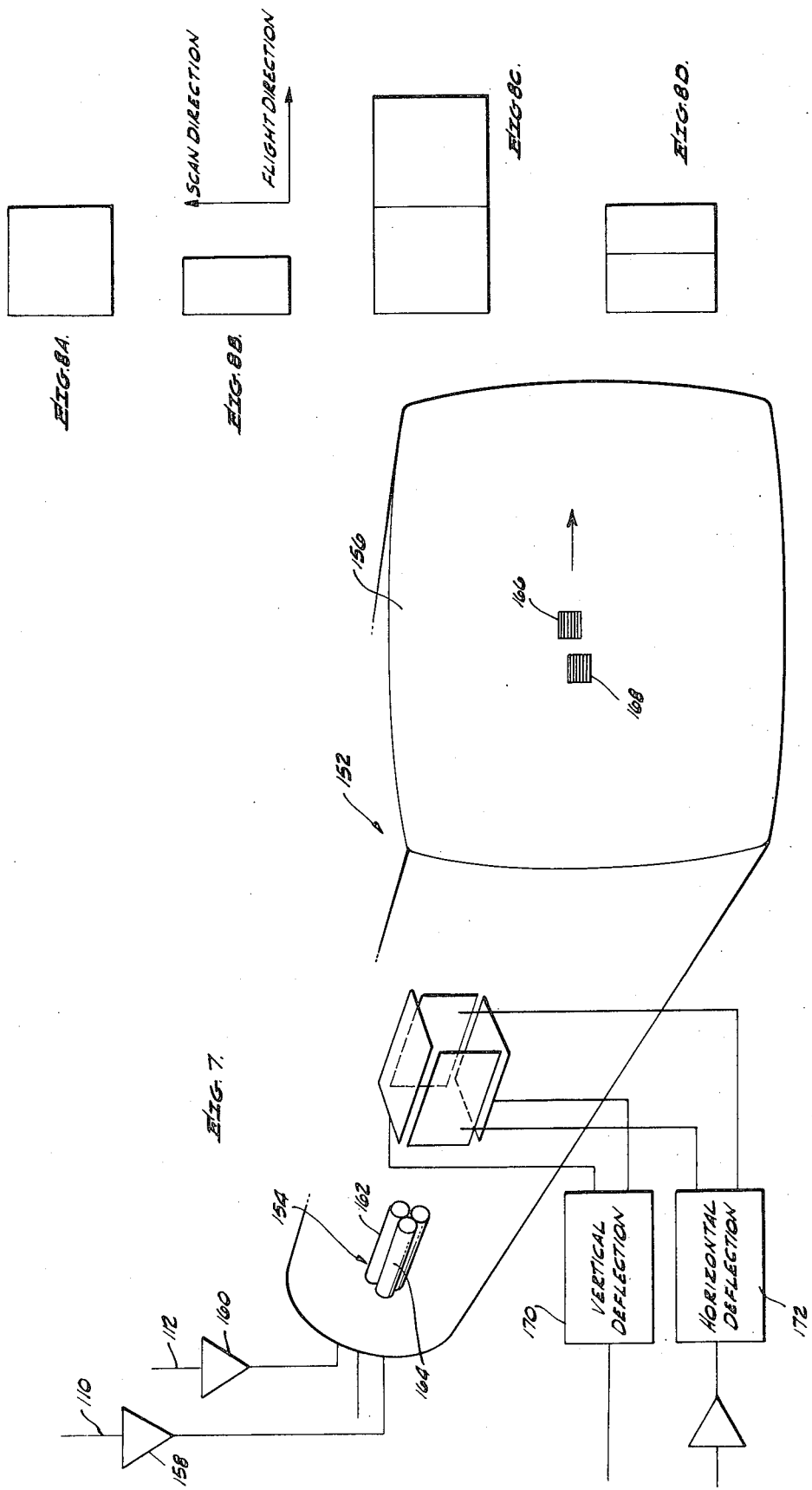

MULTIPLE DETECTOR SCANNER WITH DETECTORS SPACED ACROSS SCAN DIRECTION

CROSS-REFERENCE

This is a continuation-in-part of Pat. application Ser. No. 746,555, filed July 22, 1968, by Hamilton Barhydt for "Multiple Detector Scanner With Detectors Spaced Across Scan Direction."

BACKGROUND

The multiple detector scanner with detectors spaced at right angles to the scan direction is the concern of this invention. Its value lies principally in the field of strip mapping devices, and more particularly infrared sensitive strip mapping devices.

The resolving power, or resolution of an image-forming electro-optical system can be defined as a measure of its ability to separate the perceived images of two adjacent object points. The minimum distance that these object points can be separated and still be distinguished individually depends on the contrast of the objects and the characteristics of all of the optical and electronic elements contributing to the formation of the final recorded image.

In infrared line scanners, a detector repeatedly scans the ground in a direction normal to the flight path of the aircraft carrying the equipment at such a rate that successive scans provide contiguous coverage of the ground by virtue of forward motion of the aircraft.

Two prior art devices which illustrate infrared line scanners are found in patents by H. Blackstone U.S. Pat. No. 2,282,783 granted 4-21-59 and by H. Blackstone et al. U.S. Pat. No. 2,967,211 granted 1-3-61.

SUMMARY

In order to aid in the understanding of this invention, it can be stated in essentially summary form that it is directed to a multiple detector scanner with its individual detectors located with respect to each other so that the edges of the projected fields of view in a direction normal to the scan direction is substantially equal to half the width of an individual detector.

Accordingly, it is an object of this invention to provide a scanner which improves resolution in a direction normal to the scan direction without introducing sensitivity degradation or requiring increased bandwidth. It is another object of this invention to provide a multiple detector scanner wherein the detectors are spaced in a direction perpendicular to scan direction. It is a further object to provide a multiple detector scanner adapted to be mounted upon a vehicle so that the scan direction is normal to the direction of vehicle motion and arranged to improve detector resolution in the direction of vehicle travel. It is a further object to provide an infrared scanner having a plurality of infrared sensitive detectors and adapted for airborne use and arranged so that improved resolution is accomplished in the flight direction without thermal sensitivity degradation in a direction normal to flight direction. Other objects and advantages of this invention will become apparent from a study of the following portion of the specification, the claims and the attached drawings.

BRIEF DESCRIPTION OF THE DRAWINGS

FIG. 1 is a schematic isometric view of a scanner arranged for vehicle mounting.

FIG. 2 is a schematic illustration of a first arrangement of the multiple detectors in accordance with this invention.

FIG. 3 is a schematic showing of another arrangement of the multiple detectors in accordance with this invention.

FIG. 4 is a schematic showing of another detector arrangement in accordance with this invention.

FIG. 5 is a graph illustrating phase relationships.

FIG. 7 is a schematic isometric view of an image display cathode ray tube useful to display the image signals produced by the scanner of this invention.

FIGS. 8A through 8D show detector arrangements other than the preferred arrangements of FIGS. 1 through 4.

DESCRIPTION

Figure 6:
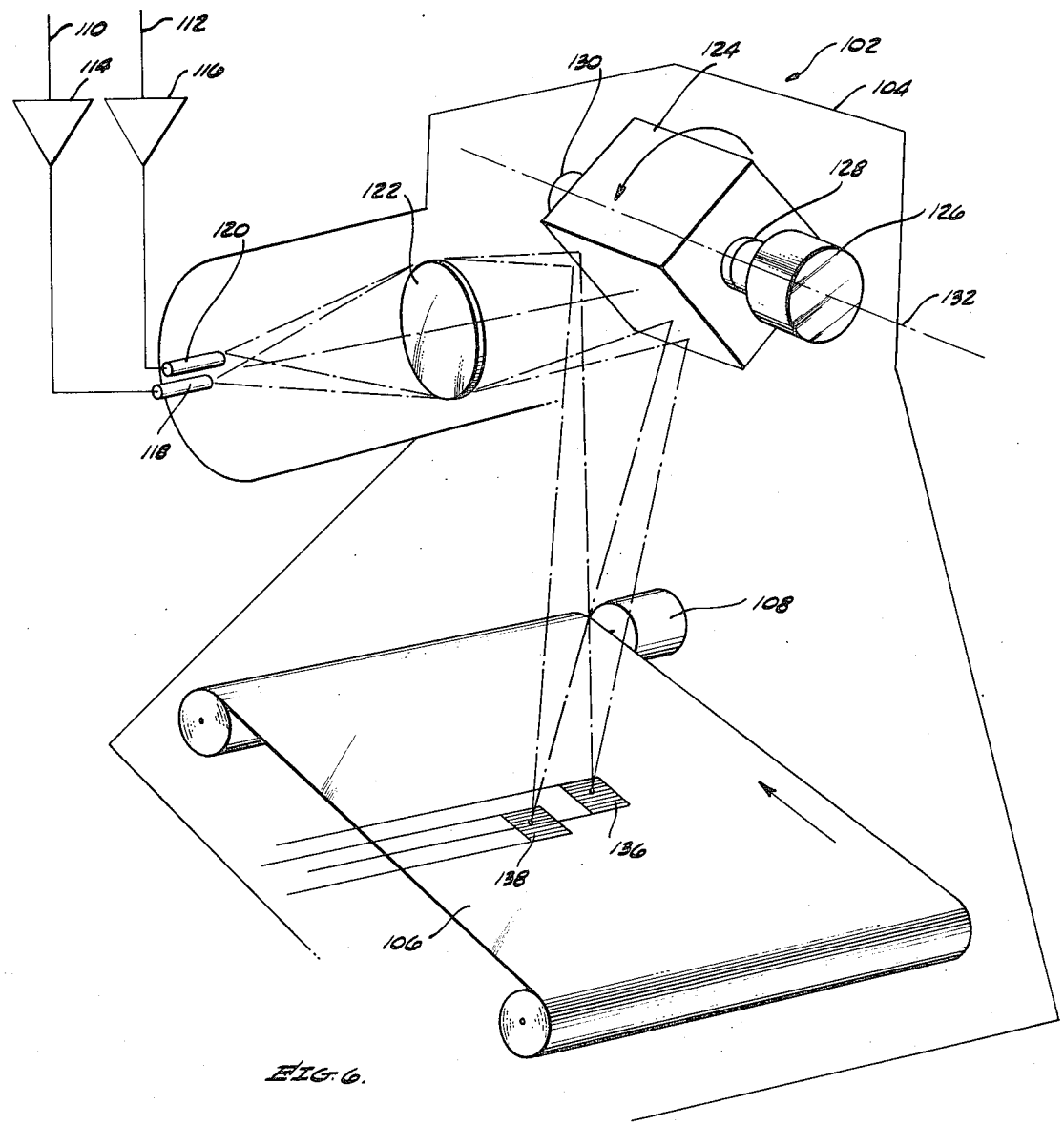
FIG. 6 is a schematic isometric view of a scanned image recorder useful to employ the scan signals from the scanner of this invention.

Referring to the drawing, the scanner of this invention is generally indicated at 10. Scanner 10 has a housing 12 which encloses and supports the optical and detector structures of the scanner. Telescope 14 extends from the side of the housing 12 and carries therein suitable lenses 16 to provide the necessary image focusing. Telescope 14 terminates at detector station 18 at which detectors are mounted.

Scanner 10 is arranged to be mounted on a vehicle, preferably an airplane, such as shown at 11, which moves in a flight direction over the ground 13 as indicated by arrow 20. Four-sided rotating scanning mirror 22 is mounted upon suitable bearings 24 and 26 to rotate on an axis 28 which is substantially parallel to the flight direction 20. Scan drive motor 30 is connected to rotate mirror 22 on its axis. Output line 31 signals mirror rotative position.

Detectors 32 and 34 are positioned on the detector station 18 end wall of telescope 14 and the entire optical system is arranged so that these detectors respectively have projected fields 36 and 38.

Projected field 36 has front edge 80, rear edge 82, right edge 84 and left edge 86, as considering the field moving in the scan direction shown by arrow 40. Each of the other fields has corresponding edges, and each of the detectors has corresponding edges. In the usual situation, scanner 10 is mounted in an airplane and the projected fields are on the ground below the airplane. Of course, the optics of the telescope, the mirror and the window of the scanner are such that radiation of the wavelength to which the detectors are sensitive is properly transmitted.

The composition and mounting of the detectors, apart from the inter-position relationship of the detectors, and the preferably square configuration of the detectors do not form part of this invention. On the other hand, conventional detectors, as known in the prior art, are usable herein. Specific examples of prior art detectors which are useful are illustrated in patents by D.H. Andrews U.S. Pat. No. 2,189,122 granted 2-6-40 by J.R. Jenness, Jr. U.S. Pat. No. 2,768,265 granted 10-

23-56 by W.H. Brattain et al. U.S. Pat. No. 3,022,374 granted 2-20-62 by R.W. Ure, Jr, et al. U.S. Pat. No. 3,103,587 granted 9-10-63 by M.L. Schultz et al. U.S. Pat. No. 3,105,906 granted 10-1-63 by H.J. Beaupre et al. U.S. Pat. No. 3,128,253 granted 4-7-64 by C.M. Mesecke U.S. Pat. No. 3,139,599 granted 6-30-64

Referring to FIGS. 2, 3, and 4, additional patterns of detectors are illustrated therein. In each of these patterns, as well as the pattern shown in FIG. 1, a plurality of detectors are used, and the detectors are arranged so that adjacent edges are spaced a half detector width from each other in a direction perpendicular to the scan direction. As is understood from the previous description and the geometry of the previously described structure, the scan direction is illustrated by arrow 40 in FIG. 1. In FIG. 2, detectors 42, 44, 46 and 48 are square detectors arranged in a straight line in a direction perpendicular to the scan direction and are positioned so that the space 50 between adjacent detectors is substantially equal to half the detector width. In both FIGS. 1 and 2, it is clear that the dimensions from the edge of one detector to the edge of another detector is substantially equal to half the detector width in the direction perpendicular to the scanned direction.

FIG. 3, detectors 52, 54, 56 and 58 are square detectors arranged contiguously. However, they are associated with detectors 60, 62, 64 and 66 which are also contiguously arranged but are arranged so that the edges of the detectors in one contiguous row are spaced a half detector width from the edges of the detectors in the adjacent contiguous row, in the direction perpendicular to the scan direction. Similarly, the arrangement of the detectors in FIG. 4 is such that detectors 68, 70, 72 and 74 are not arranged in contiguous rows but are separately mounted, with the edges of adjacent detectors spaced a half detector width in a direction perpendicular to the scan direction. With respect to FIGS. 3 and 4, the distance from the edge of one detector to the edge of another detector is substantially half a detector width in the direction perpendicular to the scan direction.

While two detectors are illustrated in FIG. 1, and a larger number of detectors are illustrated in FIGS. 2, 3 and 4, it is clear that any convenient number of detectors can be used, so long as there is a plurality. In fact, the arrangement in FIG. 1 is the same as the arrangement in FIGS. 3 and 4, when FIGS. 3 and 4 arrangements are limited to two detectors. The critical arrangement is that adjacent detectors in the direction perpendicular to the scan direction are arranged to be spaced so that the edges thereof are spaced substantially half a detector width in the direction perpendicular to the scan direction. This arrangement provides a maximum improvement in resolution in a direction perpendicular to the scan direction with a minimum increase in complexity as compared to single detector arrangements.

Multiple channel electronics are connected with a channel to each detector, and are connected to conventional readout equipment. In the aircraft environment, the conventional readout is a strip map recorder so that as the air craft flies over terrain, a strip map of the terrain is provided. Thermal sensitivity is not degraded as it would be by the use of narrower detectors, and video bandwidth is not increased as it would be by narrower detectors because the angular rotation of the mirror is not increased.

Referring to FIG. 6, mapper 102 is one illustrative embodiment of an output into which the detector signals can be inserted, in order to utilize the signals to provide an analog display. Mapper 102 has a housing 104 which is preferably light-tight, so that it can be interiorly employed for photographic exposure. Photosensitive film 106 is advanced by motor 108 from a supply reel to a windup reel at a speed which is preferably proportional to the relative speed of aircraft 11 over ground 13, in accordance with an appropriate scale factor. If desired, motor 108 can be drive, in accordance with a signal emitted by an instrument showing the relative velocity of airplane 11.

Analog equipment is positioned in housing 104 and associated therewith, in order to convert the output signals of detectors 32 and 34 into corresponding exposure of film 106. Detectors 32 an 34, respectively, have output lines 110 and 112 which are respectively connected to amplifiers 114 and 116 (see FIG. 6). The amplifier outputs are connected to illumination sources or lamps 118 and 120. These lamps are arranged to emit photons substantially in a proportion to the input of detectors 32 and 34, respectively. Lamps 118 and 120 are, furthermore, respectively positioned and have light outputs shaped like the detectors 32 and 34, so that they are the substantial analogs of the detectors. Lens 122 focuses the images.

Rotating mirror 124 is rotatably driven by motor 126. The motor rotates on bearings 128 and 130, which define an axis 132. The axis extends in a direction parallel to the direction of motion of film 106 and defines the scan direction as being perpendicular to the axis 132. Thus, the scan direction is across film 106 in a direction transverse to its motion. The rotative speed of mirror 124 by its motor 126, as well as its relative instantaneous angular position with respect to mirror 22, is controlled. This can either be accomplished by manual adjustment of the speed of motor 126, or the two mirrors can be servoed together by means of a signal on output line 31 being fed to motor 126 to control the angular position and speed of mirror 124. By this means, illuminated spots 136 and 138 move across the film 106 in the scan direction. These spots exactly correspond to the viewed projected fields 36 and 38. Thus, a strip map is exposed on film 106, which is subsequently developed by any convenient means which is compatible with the character of film 106.

FIG. 7 illustrates a cathode ray tube 152, shown principally in schematic form, as another means for the utilization of signals from detectors 32 and 34. Cathode ray tube 152 has a multiple gun structure and a three gun structure 154 is illustrated. While only two guns are needed, one corresponding to each of the detectors 32 and 34, three gun structures are well-known because they are used in modern-day color kinescopes. The gun structures 154 include electron sources, as well as collimation and focusing means. Suitable three gun structures are shown in patents by D.D. Van Ormer U.S. Pat. No. 2,721,287 granted 10-18-55, by R.E. Benway U.S. Pat. No. 2,806,163 granted 9-10-57, by E. Sanford U.S. Pat. No. 2,829,291 granted 4-1-58

Another teaching of such multiple beam guns for cathode ray tubes is found in "Three Beam Guns for Color Kinescopes," by H. C. Moodey and D. D. Van Ormer, published in the *Proceedings of the Institute of Radio Engineers*, Volume 39, pages 1236 through 1241, 1950. While these illustrate three gun tubes, one gun can be left as a spare. On the other hand, three guns can be used where three detectors are used in the detector system. For more detectors, more guns would be employed.

Lines 110 and 112 are connected through conventional amplifiers 158 and 160 to electron guns 162 and 164. The other electron gun is held as a spare. These electron guns are arranged so that the emission therefrom is proportional to or otherwise related to the incident radiation on detectors 32 and 34.

It is conventional in color kinescope operation to employ beam convergence systems. The purpose of these systems is to converge the three beams so that they are directed at the same opening in a shadow mask. In the present case, rather than employment of a shadow mask and three-color phosphor, the display surface 156 carries a monochromatic phosphor, without the benefit of any masks. The beam convergence apparatus is adjusted to display phosphor in image spots 166 and 168 on the face of the tube corresponding in related size and position to the respective projected fields 36 and 38. Suitable beam convergence apparatus is shown in patents: by M.M. Carpenter, Jr. U.S. Pat. No. 2,728,022 granted 12-20-55, by M.D. Nelson U.S. Pat. No. 2,728,023 granted 12-20-55

As is conventional in color kinescope operation, only one deflection means need be employed to deflect the several beams. Vertical deflection circuit 170 is connected to deflect the electron beam vertically corresponding to the relative forward motion of airplane 11 over ground 13 in the flight direction 20, times an appropriate scale factor. Horizontal deflection circuit 172 is connected to horizontally deflect the phosphor image spot corresponding to the scan direction. Again, the signal can be manually locally adjusted, or is preferably servoed from the position signal in line 31. Accordingly, the position of mirror 22 is signaled through line 31 to horizontal deflection circuit 172 so that the spots scan across the face 156 and are snapped back at the appropriate time for the next scan, as is common in television practice. The phosphor on display surface 155 has sufficient retention so that the illuminated image remains for a sufficient length of time to present a map image.

In order to explain the relative advantages of this invention over earlier designs the following expressions for the scan rotor speed and the thermal sensitivity are useful.

$$R = \frac{V/H}{(1-p)nm\beta}$$

$$\Delta T(S/N=1) = \frac{1}{\alpha\beta}\left(\frac{2\pi\kappa V/H}{(1-p)nm}\right)^{1/2} \frac{2}{\pi\eta_o (Vis)^{1/2} D(D^* \sin\theta)(_aN'_T)}$$

where
$R$ = scan rotor speed
$V/H$ = velocity/altitude ratio
$p$ = fractional scan overlap
$n$ = number of detector elements
$m$ = number of scans per rotation of scan rotor
$\beta$ = angular width of detector field of view in direction of flight $\Delta T(S/N=1)$ = temperature difference that yields a signal-to-noise ratio of unity for pattern areas large relative to instantaneous detector field of view
$\alpha$ = angular width of detector field of view in scan direction
$\kappa$ = ratio of angular rotation rate of line of sight to angular rotation rate of scan rotor
$\eta_o$ = transmission of optical system
$VIS$ = signal processing visibility factor (reciprocal of product of detector dwell time and noise equivalent bandwidth)
$D$ = effective scanner aperture diameter
$D^*$ = detector spectral detectivity
$Sin$ = numerical aperture of scanner optics
$a$ = atmospheric transmission
$N'_T$ = spatial derivative with respect to temperature of the target area spectral radiance By combining all of the parameters which are not of direct bearing on this invention into arbitrary multiplying factors, these two expressions can be simplified to $$R = \frac{1}{(1-p)n\beta} K_1$$

$$\Delta T(S/N=1) = \frac{1}{(1-p)^{1/2} n^{1/2} \alpha\beta} K_2$$

The resolving power, or resolution of an image-forming electro-optical system can be defined as a measure of its ability to separate the recorded image of two adjacent object points. The minimum distance that these images can be separated and still be distinguished individually depends on the contrast of the objects and the characteristics of all of the optical and electronic elements contributing to the formation of the final recorded image.

In infrared line scanners, the considerations determining the angular resolution in the direction parallel to the scan lines are quite different from those for the direction normal to the scan lines. The former involves a continuous video signal and can be dealt with using linear frequency analysis, while the latter is in effect a sample data system requiring appropriate sample data processing analysis.

The angular resolution capability of a scanner is usually tested with a bar pattern consisting of alternate black and white bars of equal widths. When the width of the bars is large relative to the projected detector field width, the system resolution is usually very good, but as the bar width is reduced, the resolution capability degrades. When the bars lie normal to the direction of scan, that is, in a direction parallel to the flight path, the system response drops to zero when the bar width is reduced to one half the detector field width according to linear modulation theory. For a bar pattern oriented in the direction parallel to the scan direction, or normal to the flight path, the resolution is limited by the fact that the data gathering is essentially a sampling process.

In the usual line scanning system with a single element detector, the performance limit is considered to occur at that point where the scan-to-scan overlap is reduced to zero by increasing the velocity over altitude ratio and contiguous scanning occurs. In the case where the bar pattern lies normal to the flight path and the projected detector field equals the bar width of the test pattern, contiguous scanning will produce a relative peak signal ranging from unity to zero depending on the phasing of the projected detector field relative to the bar pattern. Thus, if a square detector as shown in FIG. 8A with a projected field width equal to the test bar width is used, the image quality in the direction of flight is poorer than that in the perpendicular direction.

This problem can be remedied by modifying the design such that there is still overlap at the maximum velocity over altitude value. By increasing the scan overlap from zero to one-half of the projected detector field width, a relative peak signal of 0.5, generally independent of the scan phasing, is obtained. However, providing such a 2 to 1 scan overlap requires doubling the scan speed, presuming that the previous detector field size is retained and the velocity to height ratio of the aircraft is held constant. This in turn doubles the required video bandwidth and as a result degrades the thermal sensitivity of the detector by a factor of the square root of two.

Another way of remedying the scan phasing problem is to use a projected detector field in the direction of flight which is no more than one-half of a bar width of the test pattern. The detector field is reduced to one half a bar width in the direction of flight, while retaining a detector field width equal to a bar width in a direction normal to the flight path, as shown in FIG. 8B. This yields a relative peak signal of unity for all phasing situations with a contiguous scan. In this case, the scan speed must be doubled to retain a contiguous scan. These changes result in a video bandwidth which is quadrupled because there is a factor of two for the increased scan speed and a factor of two for the decreased detector width. Additionally, the thermal sensitivity is degraded by a factor of two. Thus, this solution is even less acceptable than the scan overlap solution.

The only practical approach to improving the angular resolution capability in the direction parallel to the flight path while retaining or improving thermal sensitivity is to use a plurality of detectors. However, when square detectors are used and are mounted immediately adjacent to each other, as shown in FIG. 8C, the problem remains unsolved, for the scan phasing problems still exist. The provision of two contiguous rectangular detectors lying within the outline of a single square detector (see FIG. 8D), overcomes the scan phasing problem, but introduces thermal sensitivity degradation proportional to the square root of two, compared to the single square detector. Such an arrangement will also produce objectionable striations due to an unequal exposure in the film recorder upon small scan overlaps.

The arrangement of two detectors such that one edge of the detectors is positioned at a dimension of substantially half a detector width in the direction of flight offers the optimum use of two detectors. A thermal sensitivity improvement of the square root of 2, as compared to a single square detector, is realized when integration of the noise from the two detectors occurs during the film exposure. It is clear from this arrangement that the spacing of the two detectors by one half of the detector width eliminates the scan phasing problem discussed above, for the case of a bar pattern parallel to the scan direction with a bar width equal to the width of the projected detector field.

The validity of this statement can be demonstrated by the following simple analysis. Consider a rectangular detector making successive contiguous scans over an alternating pattern of equal width black and white bars in a direction parallel to the bars. Presuming that the relative signal level difference generated by scanning along a black bar and then along a white bar is A, then the relative signal level difference generated in successive scans, as a function of the scan phase angle $\theta$, is shown by curve No. 1 in FIG. 5. The scan phase angle is the relationship between the projected detector field and the bars in a direction at right angles to scan and to the bars.

This signal level difference varies between zero and A, depending on the phase angle. The relative signal level difference generated by a second detector spaced at one-half a detector width from the first is shown by curve 2. This also varies from zero to A. If the signals from these two detectors are combined and averaged, a constant signal level difference of 0.5A results, as shown in curve 3.

Furthermore, such an arrangement reduces striations in the exposed image on the film for all successive scan spacings equal to or less than the detector width. The above is also true when more than two detectors are used, providing they are spaced substantially one-half detector width from adjacent detectors in the direction perpendicular to the scan direction.

The use of multiple detector elements in an infrared line scanner, as described above, can lead to geometrical problems because of the hyperbolic scan paths described by the projections of the fields of view of the individual detector elements as they are scanned away from the nadir. In the case of only two detectors, especially when the detectors are over-lapped by half a detector width as is illustrated in FIG. 1, the effect is minimal and is not objectionable for scan angles up to 60° on each side of the vertical.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim

1. A multiple detector scanner, said multiple detector scanner comprising:
   first and second detectors for detecting radiance;
   means for projecting a field of view of each of said detectors;
   means connected to said first and second detectors for causing the projected fields of view of said first and second detectors to scan in a scan direction;
   means for causing the distance between the edges of the projected fields of view of said first and second detectors in a direction normal to the scan direction to be substantially half the width of one of the projected fields of view.

2. The multiple detector scanner of claim 1 wherein said first and second detectors are positioned within said scanner so that the distance between the edges of said first and second detectors in a direction normal to the scan direction is substantially half a detector width.

3. The multiple detector scanner of claim 2 wherein said first and second detectors have optical elements optically positioned between said detectors and the projected fields of view which form the projected fields of view.

4. The multiple detector scanner of claim 3 wherein the same optical elements form the projected fields of view for both said first and second detectors.

5. The multiple detector scanner of claim 2 wherein said detectors are substantially square.

6. The multiple detector scanner of claim 5 wherein said detectors are spaced from each other so that there is a space therebetween in a direction normal to the scan direction substantially equal to half of the width of one of said detectors.

7. The multiple detector scanner of claim 5 wherein said means for causing is such that the path of travel of the projected field of view of one of the edges of said second detector when moving in the scan direction is substantially halfway between the paths of the edges of the field of view of said first detector in a direction normal to the scan direction and said first and second detectors having different fields of view.

8. The multiple detector scanner of claim 7 wherein said first and second detectors lie in first and second rows of contiguous detectors.

9. A multiple detector scanner, said multiple detector scanner comprising:
first and second detectors sensitive to infrared radiation for detecting radiance, said first and second detectors being positioned within said scanner so that the distance between the edges of said first and second detectors in a direction normal to the scan direction is substantially half a detector width;
means connected to said first and second detectors to cause a projected field of view of said first and second detectors to scan in a scan direction;
optical elements optically positioned between said detectors and the projected fields of view, said optics permitting the transmission of infrared radiation, the same optical elements forming the projected fields of view;
said first and second detectors being positioned and said optical elements being arranged so that the distance between the edges of the projected fields of view of said first and second detectors in a direction normal to the scan direction is substantially half the width of one of the projected fields of view.

10. The multiple detector scanner of claim 9 wherein said optics include at least one lens and at least one mirror.

11. A multiple detector scanner, said multiple detector scanner comprising:
first and second detectors for detecting radiance;
means connected to said first and second detectors for utilizing radiance detected thereby, said utilization means including means for rendering visible the radiance of said first and second detectors;
means connected to said first and second detectors to cause a projected field of view of said first and second detectors to scan in a scan direction;
said first and second detectors being positioned within said scanners so that the distance between the edges of said first and second detectors in a direction normal to the scan direction is substantially half a detector width and so that the distance between the edges of the projected fields of view of said first and second detectors in a direction normal to the scan direction is substantially half the width of one of the projected fields of view.

12. The multiple detector scanner of claim 11 wherein said detectors are substantially square.

13. The multiple detector scanner of claim 12 wherein said detectors are spaced from each other so that there is a space therebetween in a direction normal to the scan direction substantially equal to half of the width of one of said detectors.

14. The multiple detector scanner of claim 12 wherein the path of travel of the projected field of view of one of the edges of said second detector when moving in the scan direction is substantially halfway between the edges of said first detector in a direction normal to the scan direction and said first and second detectors are non-overlapping in the scan direction.

15. The multiple detector scanner of claim 14 wherein said first and second detectors lie in first and second rows of contiguous detectors.

16. The multiple detector scanner of claim 11 wherein said first and second detectors have optical elements optically positioned between said detectors and the projected fields of view which form the projected fields of view.

17. The multiple detector scanner of claim 16 wherein the same optical elements form the projected fields of view for both said first and second detectors.

18. The multiple detector scanner of claim 17 wherein said detectors are sensitive to infrared radiation and said optics permit the transmission of infrared radiation.

19. The multiple detector scanner of claim 18 wherein said optics include at least one lens and at least one mirror.

* * * * *